(12) United States Patent
Aydin et al.

(10) Patent No.: US 9,013,497 B2
(45) Date of Patent: Apr. 21, 2015

(54) IMAGE AESTHETIC SIGNATURES

(75) Inventors: Tunc Ozan Aydin, Zurich (CH); Aljosa Smolic, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 234 days.

(21) Appl. No.: 13/560,271

(22) Filed: Jul. 27, 2012

(65) Prior Publication Data
US 2014/0028695 A1 Jan. 30, 2014

(51) Int. Cl.
*G09G 5/00* (2006.01)

(52) U.S. Cl.
CPC ........................................ *G09G 5/00* (2013.01)

(58) Field of Classification Search
None
See application file for complete search history.

(56) References Cited

U.S. PATENT DOCUMENTS

| 7,113,620 B2 * | 9/2006 | Shiotani ........................ 382/112 |
| 8,660,342 B2 * | 2/2014 | Obrador et al. ............... 382/164 |
| 2010/0316292 A1 * | 12/2010 | O'Hara et al. ................ 382/168 |

OTHER PUBLICATIONS

Hasler, D. and Susstrunk, S. Measuring Colourfulness in Natural Images. Proc. of SPIE v.5007; Jan. 2003, p. 87-95, Santa Clara, CA, USA.

* cited by examiner

*Primary Examiner* — Antonio A Caschera
(74) *Attorney, Agent, or Firm* — Patterson + Sheridan, LLP

(57) ABSTRACT

An approach for determining transducer functions for mapping objective image attribute values to estimated subjective attribute values. The approach includes determining objective attribute values for each of one or more aesthetic attributes for each image in a first set of images. The approach further includes determining, for each aesthetic attribute, a mapping from the objective attribute values to respective estimated subjective attribute values based on the objective attribute values and corresponding experimentally-determined attribute values. Using the determined mappings, aesthetic signatures, which include estimates of subjective image aesthetics across multiple dimensions, may be generated.

34 Claims, 5 Drawing Sheets

IMAGE AESTHETIC SIGNATURES

BACKGROUND

1. Field

Embodiments presented herein provide techniques for evaluating image aesthetics. More specifically, embodiments presented herein disclose techniques for determining mappings from objective image attributes to subjective image attributes and using the determined mappings to generate aesthetic signatures which include estimates of subjective image aesthetics across multiple dimensions.

2. Description of the Related Art

High-quality cameras, either stand-alone or integrated into other devices (e.g., mobile devices), as well as image editing tools, have become increasingly prevalent. These image acquisition and manipulation devices put more power into the hands of average users. However, obtaining aesthetically-appealing images often requires training and experience that average users often lack.

Automated image aesthetics involves making aesthetic judgments of image quality or appeal using computational techniques. Such aesthetic judgments may help average users capture aesthetically-appealing images by, for example, automatically capturing the images when they are aesthetically appealing according to some criteria (e.g., when persons depicted in the image are smiling). However, automated image aesthetics has often been approached as a learning problem on image features obtained from sets of images, where the task is a binary classification between aesthetically pleasing and not aesthetically pleasing. The accuracy of this and other approaches, when compared to subjective aesthetics judgments (i.e., human judgments of aesthetics), has shown room for improvement in many cases.

SUMMARY

One aspect of the invention provides a computer implemented method for determining transducer functions for mapping objective image attribute values to estimated subjective attribute values. The approach includes determining, via one or more processors, objective attribute values for each of one or more aesthetic attributes for each image in a first set of images. The approach further includes determining, for each aesthetic attribute, a mapping from the objective attribute values to respective estimated subjective attribute values based on the objective attribute values and corresponding experimentally-determined attribute values.

The mappings may permit more accurate estimations of subjective image attribute judgments. Further, estimated subjective image attribute values may have a variety of applications, including, but not limited to, comparing two images to determine which is more aesthetically pleasing and guiding a user during image editing.

Other aspects include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Figure 1:
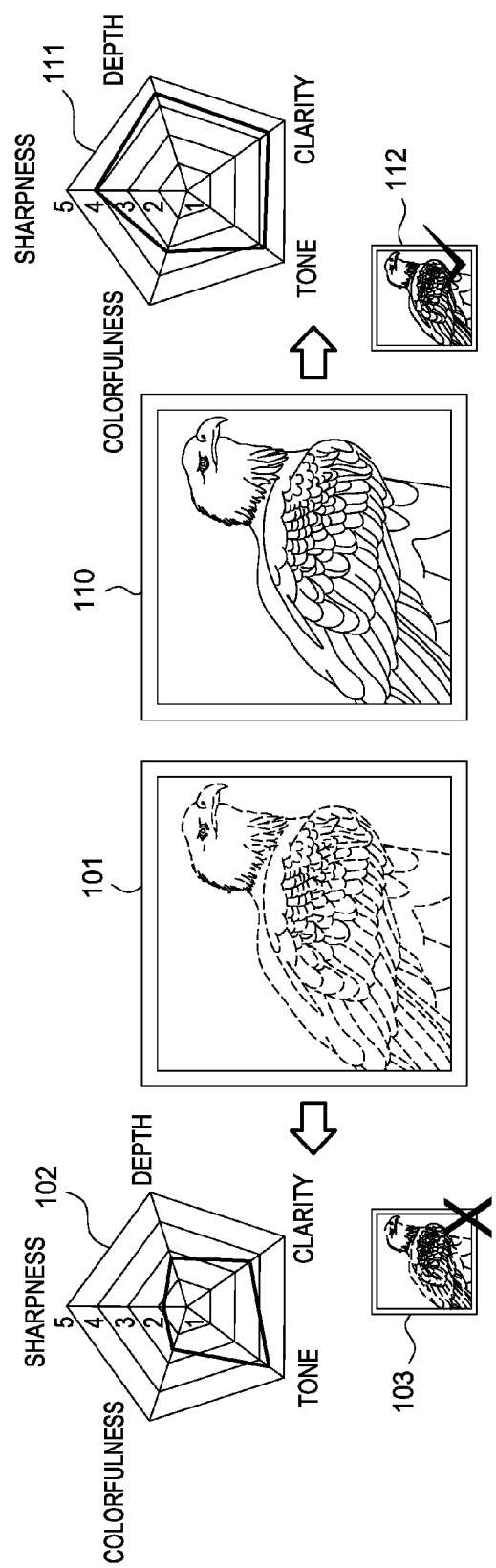
FIG. 1 illustrates a set of example images and corresponding aesthetic signatures, according to one embodiment.

Embodiments disclosed herein provide techniques for determining mappings from objective attribute values to subjective attribute values, and generating image aesthetic signatures using such mappings. Objective attribute values may be calculated for a sample set of images using various algorithms. Based on corresponding subjective attribute values for the sample set of images, a calibration application may determine transducer functions for the attributes which map objective attribute values to subjective attribute values.

Once determined, the transducer functions may then be used to estimate subjective attribute values based on corresponding objective attribute values for an image. That is, subjective perceptions of the attributes for the image may be estimated based on objectively-obtained attribute values. An aesthetic signature for the image includes one or more of such estimated subjective attribute values. The aesthetic signature may be used in various ways, including, e.g., being used to determine which of two images is more aesthetically pleasing.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 illustrates a pair of example images and corresponding aesthetic signatures, according to one embodiment. As shown, images 101, 110 are photographs of eagles. Although images 101 and 110 depict similar subject matter, the images 101, 110 do not share the same aesthetic characteristics. For example, image 101 is out of focus, whereas image 110 depicts a focused image of a foreground eagle.

As further shown in FIG. 1, diagrams 102, 111 graphically represent aesthetic signatures for the images 101, 110. In this example, each aesthetic signature includes five values: sharpness, depth, clarity, tone, and colorfulness. Diagram 102 depicts the aesthetic signature of image 101, which, as shown, has sharpness, depth, clarity, tone, and colorfulness values of approximately 2, 2.75, 3.75, 4.25, and 2.5. Similarly, diagram 111 depicts the aesthetic signature of image 110, which, as shown, has sharpness, depth, clarity, tone, and colorfulness values of approximately 4, 4.5, 4.5, 4.25, and 2.25.

In one embodiment, a value for the sharpness attribute may be determined based on an average magnitude of high spatial frequency contrast at in-focus region(s). In sharp images, the in-focus region(s) tend to have high frequency contrast. On the other hand, photographs that are not sharp may have blurry region(s) of focus. Note, the in-focus region(s) may include one or more portions of the image or the entire image.

A value for the depth attribute may be determined based on the dominant spatial frequencies of in-focus (i.e., foreground) region(s) and background region(s) of the image. For example, narrowing a depth-of-field is a common photographic technique that generates various degrees of depth in the background. Doing so results in lower frequency details being dominant in the background and a less "flat" overall appearance.

A value for the clarity attribute may be determined based on the size of the in-focus region(s) and the contrast magnitudes of the in-focus region(s) and the background region(s). In general, a clarity rule may favor images with clearly identifiable regions of interest to which the viewer's eyes are attracted and a distinct background, as opposed to visually cluttered images where identifying a region of interest is difficult. For example, using "negative space" (i.e., empty image regions) is a common photographic technique for providing clarity.

A value for the tone attribute may be determined based on the lightness difference between the brightest and darkest regions of the image (i.e., the global contrast). A sufficient level of global contrast may result in more plausible photographs. On the other hand, images having low global contrast may appear over- or under-saturated and "washed out." For example, photographers commonly use full, rather than partial, dynamic range available, which tends to increase the global contrast and the tone of images.

A value for the colorfulness attribute may be determined based on standard deviation and mean of opponent color channels yellow-blue and red-green. The colorfulness attribute may be used to differentiate images having lively and saturated colors from images with desaturated colors.

The image aesthetic signatures depicted in diagrams 102, 111 may include image attribute values which are determined based on a mapping from objective attribute values to estimated subjective values. For example, the values of the sharpness attribute in diagrams 102 (approximately 2) and 111 (approximately 4) may be estimated subjected attribute values. As used herein, objective attribute values are values determined using algorithms which are not further mapped to estimated subjective attributes. As used herein, subjective attribute values are values assessed by humans. Such subjective attribute values may be estimated from objective attribute values via a mapping which converts objective to (estimated) subjective attribute values. The mapping may be determined based on objective attribute values for a sample set of images and a corresponding subjective attribute values for the sample set of images, as discussed below.

As further shown in FIG. 1, the images 101, 110 may be accepted 112 as aesthetically pleasing by an automated aesthetics application or rejected 103 as not aesthetically pleasing based on the aesthetic signatures of the diagrams 102, 111. For example, the aesthetic signatures for each image may be used to determine an overall aesthetic value representing an estimated measure of how aesthetically pleasing each image 101, 110 is on the whole. Overall aesthetic values may then be compared to determine which of images 101, 110 is more aesthetically pleasing.

Figure 2:
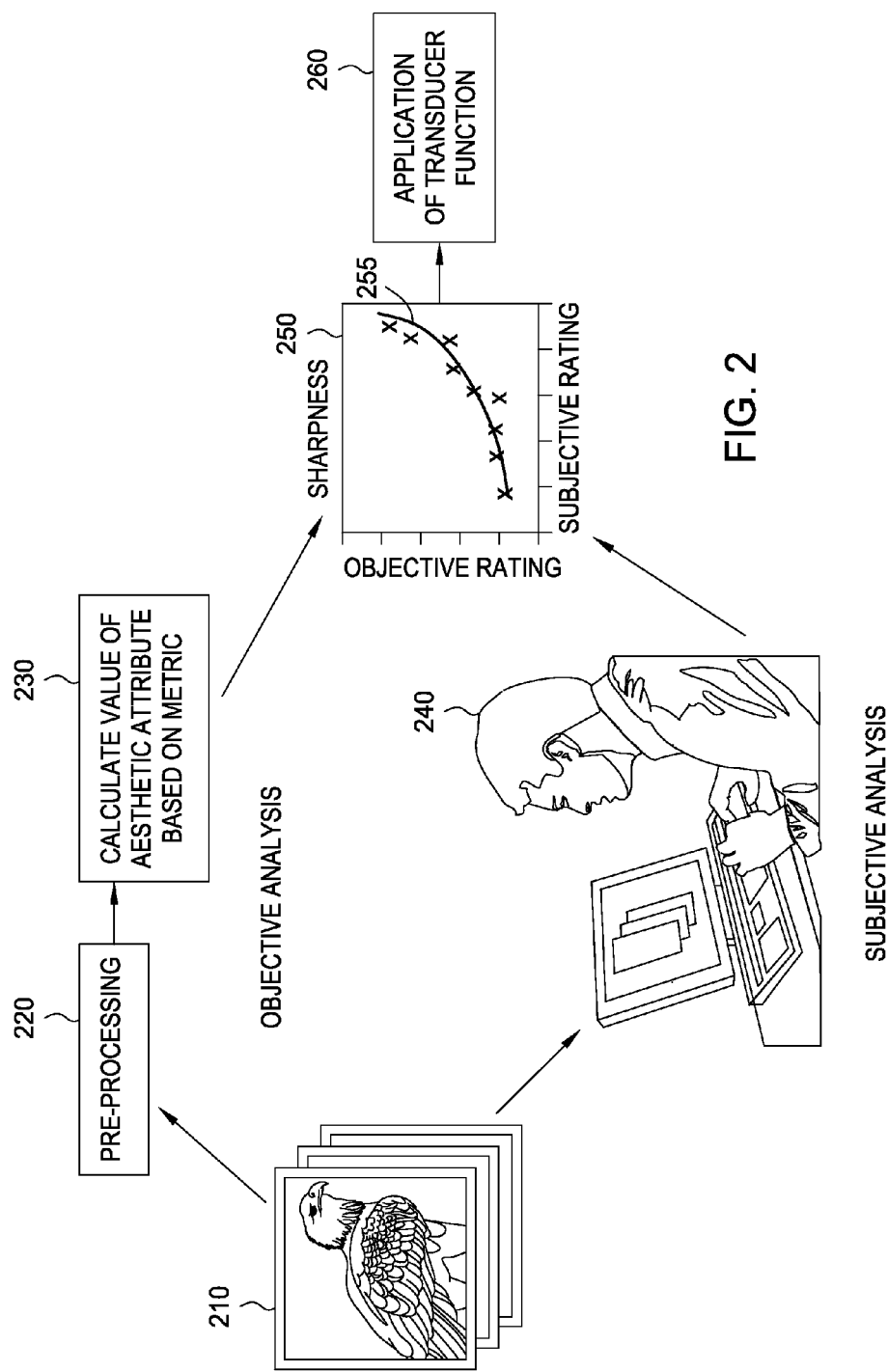
FIG. 2 illustrates an approach for determining and applying mappings of objective image attribute values to subjective attribute values, according to one embodiment.

FIG. 2 illustrates an approach for determining and applying mappings of objective image attribute values to subjective attribute values, according to one embodiment. Panel 210 shows a set of images which are analyzed objectively and subjectively in panels 220-230 and 240, respectively. The images may include photographs which vary with respect to one or more image attributes, such as sharpness, depth, clarity, tone, colorfulness, etc.

As shown in panels 220-230, an objective analysis is performed by a computer on the set of images. The objective analysis includes pre-processing of the images in panel 220.

Pre-processing may include computing one or more elements (e.g., bilateral pyramids, focus maps, etc.) for each image which are then used to determine attribute values for those images. The objective analysis further includes calculation of attribute (e.g., sharpness, depth, clarity, etc.) values for each image in panel 230 using the pre-processed elements.

As shown in panel 240, subjective analysis is also performed on the set of images. In the subjective analysis, humans (e.g., participants in a psychophysical experiment) assign attribute ratings for each of the images in the set of images. Experience has shown that baselines are needed to ensure reliability of subjective ratings. Absent such baselines, a person's attribute ratings may be unreliable until the person sees relatively extreme cases of those attributes, after which the person may use the relatively extreme cases as anchor points for their judgment. In one embodiment, the humans who assign attribute ratings are contemporaneously shown abstract images which depict a range of values for one or more attributes as baselines for assessing those attributes. For example, the abstract images may include a square (or other object) that represents a foreground object, centered in a larger square (or other object) that represents the background. Each of the foreground object and the background may have a random texture pattern generated using Perlin noise. Further, abstract images for sharpness and depth in particular may be generated by applying various amounts of Gaussian blur to the foreground texture and background texture, respectively. By contrast, abstract images for clarity may vary in the difference in the contrast magnitude of the foreground texture and the background texture, whereas the abstract images for tone may vary in the intensity difference between foreground object and background regions. Finally, abstract images for colorfulness stimuli may be generated by modulating the saturation and size of a rainbow pattern.

As shown in panel 250, the rating values of the objective analysis and the subjective analysis of the attributes are used to determine transducer functions 255 which map objective to subjective attribute values. In one embodiment, subjective ratings for each attribute of each image are averaged, and the computer solves, for each attribute, a system of linear equations built from the objective attribute values and corresponding average subjective attribute values of each image.

As shown in panel 260, the transducer functions are then applied. For example, the transducer functions may be used to determine estimated subjective attribute values of two images, and one of those images may be chosen over the other based on the estimated subjective attribute values. The transducer functions may also be used, for example, to indicate the estimated subjective value of an attribute during image manipulation, thereby assisting users who would otherwise have difficulty assessing values for those attributes. The transducer functions may further be used to generate aesthetic signatures, which include one or more estimated subjective attribute values, to help better understand what makes images aesthetically pleasing or displeasing, and to produce other images having similar pleasing or displeasing characteristics.

Figure 3:
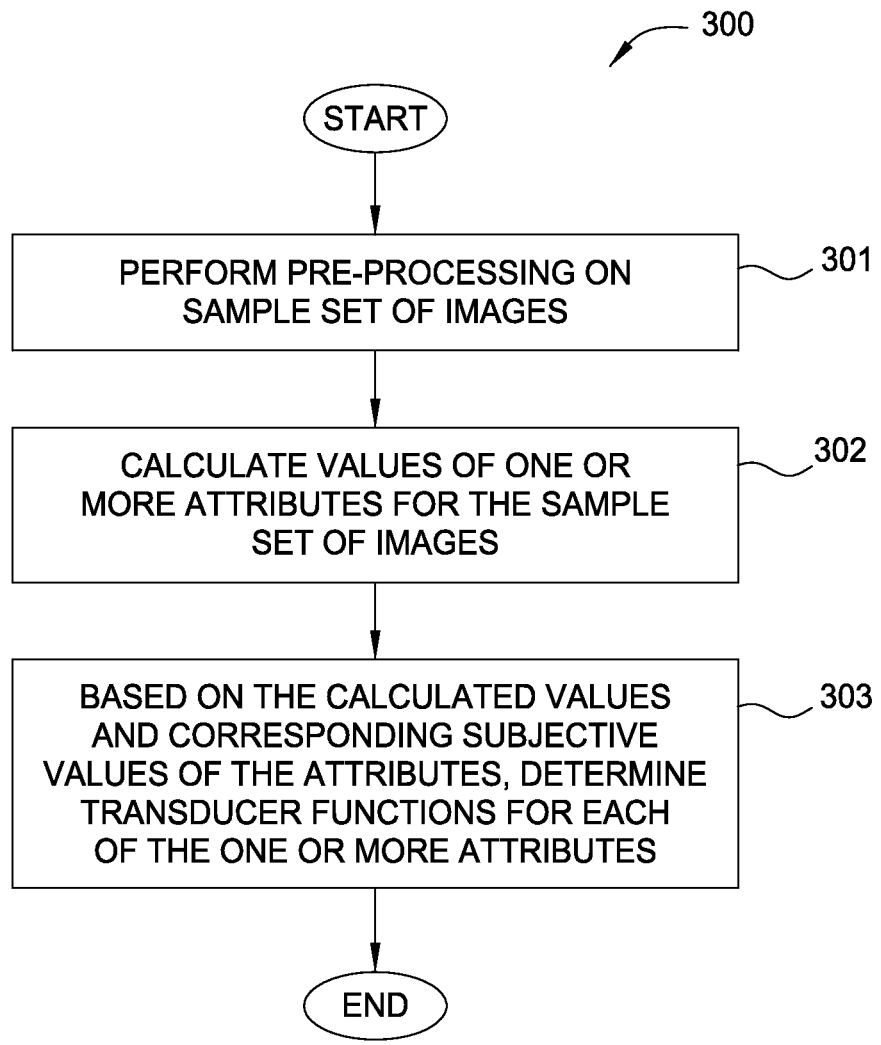
FIG. 3 illustrates a method for determining transducer functions which map objective image attribute values to corresponding subjective attribute values, according to one embodiment.

FIG. 3 illustrates a method 300 for determining transducer functions which map objective image attribute values to corresponding subjective attribute values, according to one embodiment. As shown, the method 300 begins at step 301, where a pre-processing application calculates a variety of image attributes used to determine objective image attribute values.

In one embodiment, e.g., the pre-processing may include computing bilateral pyramids, focus maps, binary maps of in-focus regions, binary maps of out-of-focus regions, an in-focus area, and an out-of-focus area. For each color channel I of an input image, each level $k \in [1, K]$ of a bilateral pyramid may be defined as:

$$LP^k = dt(I, \sigma_r, \sigma_s, N), \quad (1)$$

where dt is the domain transform operator, the range parameter $\sigma_r=1$ for $k<K$, the range parameter $\sigma_r=\text{Inf}$ for $k=K$, the spatial parameter $\sigma_s=2^{k+1}$, and N is the number of domain transform iterations (e.g., 5 iterations). A multi-scale contrast image may then be computed as follows:

$$C = |I - LP^1| + \Sigma_{k=1}^{K-1} |LP^k - LP^{k+1}| \quad (2)$$

Let the absolute difference between the input image and pyramid level $LP^1$ be the detail layer $D^1$, and the differences between subsequent pyramid levels $LP^k$ and $LP^{k+1}$ be the detail layers $D^k$. The detail layers $D^k$ may be used to compute a focus map data structure which provides a rough spatial frequency-based segmentation of the input image. In particular, a domain transform may be applied to each detail layer $D^k$ to generate filtered detail layers $\hat{D}^k$, where $k=[1, K-1]$, using gradients from the input image as an edge stopping criterion. Focus map levels $F^k$ may then be determined sequentially as follows:

$$F^k = \hat{D}^k \cdot [M \& (\hat{D}^k > \hat{D}^{k+1})], \quad (3)$$

where M is initialized as a matrix of ones with the same size as the image, and M is updated at each level k as $M = M \& (\hat{D}^k == 0)$.

In addition to the bilateral pyramid and the focus map, the pre-processing application may generate a binary map of an in-focus region $F^{if}$ of the input image by marking each non-zero value pixel of $F^1$ as 1 and each zero value pixel as 0. Further, the pre-processing application may generate an out-of-focus map $F^{oof}$ by inverting each of the values of the in-focus map $F^{if}$ (i.e., setting each 1 value to 0, and vice versa). The pre-processing application may determine values for an area of the in-focus region $A^{if}$ and an area of the out-of-focus region $A^{oof}$ by counting the number of 1's in the in-focus map $F^{if}$ and the out-of-focus map $F^{oof}$, respectively, and normalizing those counts by dividing by the total number of image pixels.

At step 302, a calibration application determines, based on the elements calculated during pre-processing, objective values of one or more image attributes for each image of the sample set of images. Image attributes may include sharpness, depth, clarity, tone, and colorfulness, which are described above. The calibration application may use various objective metrics to determine values for the image attributes.

In one embodiment, a metric for sharpness may be defined as the average contrast magnitude at the focus map level with the highest image contrast frequency ($F^1$):

$$\psi_{sh} = \mu(|F^1|), \text{ where } \mu = \frac{1}{N} \sum_{x=1}^{N} A(x). \quad (4)$$

This sharpness metric $\omega_{sh}$ tends to increase with stronger high-frequency details over a larger area.

In one embodiment, a metric for depth may estimate a perceived range of blur among all image details by searching the remaining focus map levels ($F^2$ to $F^k$) for a largest area with non-zero contrast values:

$$\psi_{de} = \text{argmax}_k [\Sigma(F^k > 0)], \quad (5)$$

where $k=[2, K]$. This depth metric $\psi_{de}$ gives zero depth for completely out-of-focus images. For example, given a three-level focus map where the first level includes sharp details which are in focus and the remaining two levels include out-of-focus regions, the depth metric $\psi_{de}$ would choose the second level of the focus map, because most of the image's non-sharp regions are at that level.

In one embodiment, a metric for clarity may be determined based on the area of the out-of-focus region and the difference of average contrast within the in-focus region with the average contrast in the out-of-focus region, as follows:

$$\psi_{cl} = A^{o \circ f} \cdot (|\mu(C \cdot F^{if}) - \mu(C \cdot F^{o \circ f})|). \quad (6)$$

This clarity metric $\psi_{sh}$ tends to increase with the presence of large image regions that are empty or contain low contrast details.

In one embodiment, a metric for tone may be based on the difference between maximum and minimum gamma-corrected luminance values of the image. To eliminate potential error from isolated pixels having very high or very low luminance values, the 95$^{th}$ and 5$^{th}$ (rather than the overall maximum and minimum) percentile values may be used, as follows:

$$\psi_{to} = c^u \cdot c^o \cdot |p^{95}(L) - p^5(L)|, \quad (7)$$

where $p^n$ refers to the n-th percentile, and $c^u = \min(u, p^{30}(L) - p^5(L))/u$ and $c^o = \min(o, p^{95}(L) - p^{70}(L))/o$ are terms which help account for over- and under-exposure. Here, u and o are constants (e.g., pixel value 0.05), and the terms $c^u$ and $c^o$ penalize large image regions with significantly low or high luminance, and as a result are likely to be over- or underexposed.

In one embodiment, a metric for colorfulness may be defined based on standard deviation and mean of opponent color channels yellow-blue and red-green, as described in Hasler, D., & Susstrunk, S., Measuring Colourfulness in Natural Images, *Proc. of SPIE: Human Vision and Electronic Imaging*, vol. 5007, pp. 87-95, which is hereby incorporated in its entirety by reference:

$$\psi_{co} = f(I_r, I_g, I_b). \quad (8)$$

At step 303, the calibration application determines transducer functions for each image attribute based on the objective attribute values calculated at step 302 and subjective values of the image attributes. The subjective values may be, for example, values of the image attributes as judged by participants in a psychophysical experiment.

The transducer functions may be determined in any feasible manner. In one embodiment, e.g., experimentally-determined subjective ratings for each attribute of each image are averaged, and, for each attribute, a system of linear equations is built from the objective attribute values and corresponding average subjective values of each attribute.

In an alternative embodiment, the transducer functions may be determined via polynomial function fitting of a plot of objective versus subjective values for each image attribute. In such a case, each image attribute may be associated with one corresponding transducer function in polynomial form which maps objective values to estimated subjective values.

Figure 4:
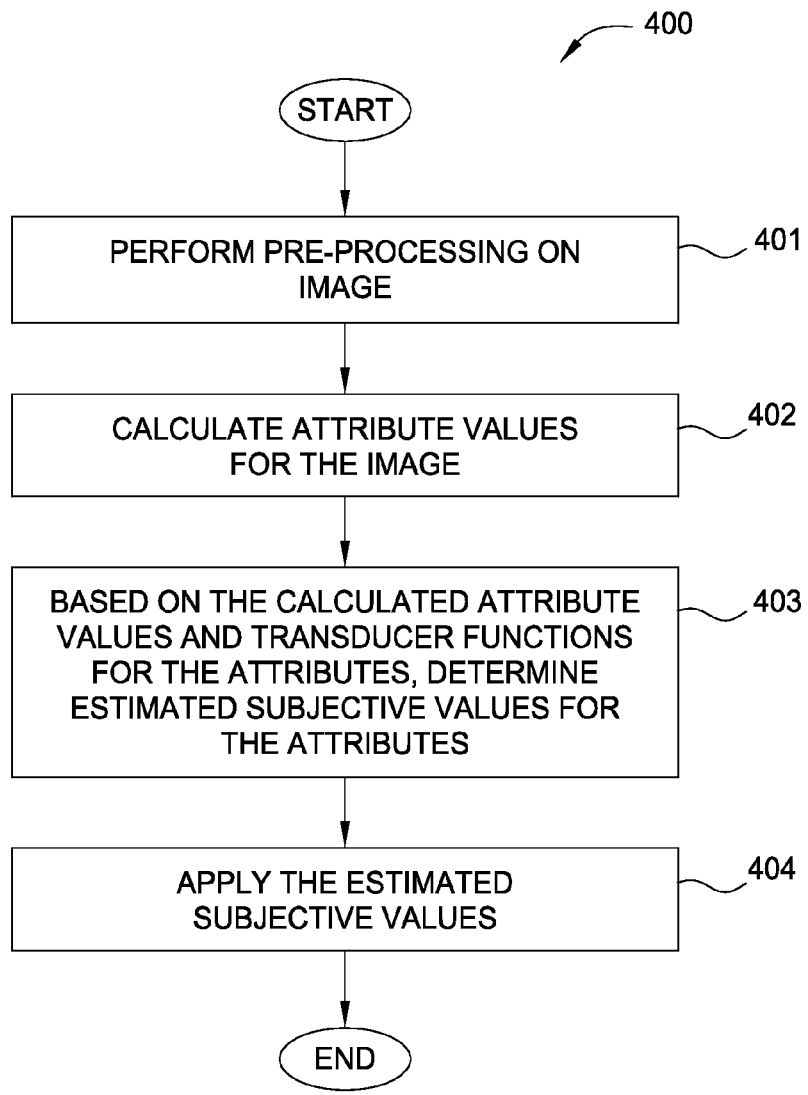
FIG. 4 illustrates a method for estimating subjective attribute values of an image and applying the estimated subjective attribute values, according to one embodiment.

FIG. 4 illustrates a method 400 for estimating subjective attribute values, according to one embodiment. As shown, the method 400 begins at step 401, where a pre-processing application calculates various elements (i.e., performs pre-processing) which are later plugged into formulas to determine objective image attribute values, similar to step 301 of the method 300.

At step 402, an aesthetic signature application calculates attribute values for the image. In one embodiment, the aesthetic signature application may determine attribute values in a manner similar to that described with respect to step 302 of the method 300.

At step 403, the aesthetic signature application determines estimated subjective values for the attributes based on the objective attribute values and the transducer functions for those attributes. For example, the aesthetic signature application may determine estimated subjective attribute values by plugging calculated objective attribute values into the corresponding transducer functions for the attributes. In one embodiment, each estimated subjective attribute value may further be normalized based on a relationship between the attribute value and an overall aesthetic value.

At step 404, the aesthetic signature application applies the estimated subjective values. The estimated subjective attribute values may be applied in any feasible manner. In one embodiment, the estimated subjective attribute values may be used to compare one or more images. In particular, the estimated subjective attribute values may be used to estimate an overall subjective aesthetics value for the images. For example, the estimated subjective attribute values and corresponding overall subjective aesthetics values for a set of images may be used as a training set, and a high-dimensional function which fits the data may be determined via a least squares approximation. Subsequently estimated subjective attribute values for images may be plugged into the high-dimensional function to produce estimated overall aesthetics values for those images. Further, estimated overall aesthetics values for two or more images may be compared to determine which image is likely to be more aesthetically appealing.

Experience has shown that sharpness, as defined above, may have a simpler relationship to the overall aesthetics value than some other aesthetics attributes. That is, higher sharpness may improve overall subjective aesthetics of an image, and vice versa. However, this relationship does not necessarily hold true for other aesthetics attributes. Consider colorfulness, for example, a grayscale picture having no color may be visually appealing, while an extremely colorful picture may not, but the reverse may also hold true. In one embodiment, an overall aesthetics rating may be determined by a formula which accounts for the relatively simple relationship between sharpness and overall aesthetics:

$$\omega = \psi_{sh} \times \mu(\psi_{de}, \psi_{cl}, \psi_{to}, \psi_{co}) \quad (4)$$

In one embodiment, the estimated subjective attribute values may be displayed to guide a user in photo editing. As shown in FIG. 1, the estimated subjective values may be represented graphically. Such graphic depictions may, for example, indicate to the user aesthetics tradeoffs when the image is altered to modify one or more image attributes. Enhancing high frequency details of an entire image, for example, tends to increase sharpness but may simultaneously decrease clarity. In a further embodiment, an overall estimated aesthetic subjective value, determined based on the estimated subjective attribute values, may be displayed to guide the user in photo editing.

Alternatively, the estimated subjective attribute values may be used to help understand the properties of particular images and why they are aesthetically pleasing or displeasing. Further images may then be created or edited to have similar estimated subjective attribute values so that those further images may be similarly aesthetically pleasing or displeasing.

Additional applications of the estimated subjective attribute values will be apparent to persons skilled in the art. Such applications may include, but are not limited to, evaluating HDR tone mapping techniques, providing aesthetic information to a user performing multi-scale contrast editing, and evaluating edited images.

Figure 5:
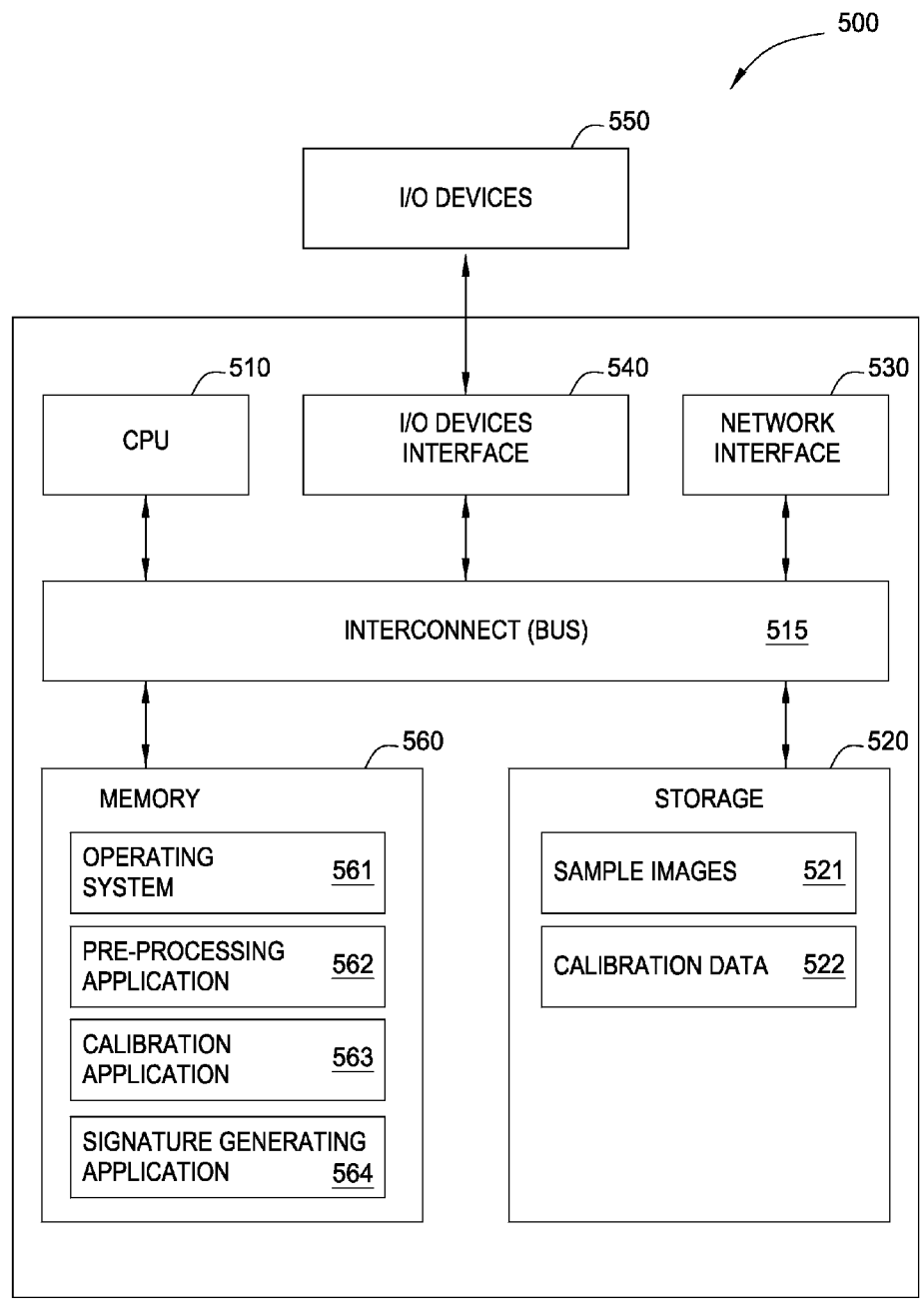
FIG. 5 illustrates a system in which aspects of the invention may be implemented.

FIG. 5 illustrates a system 500 in which aspects of the invention may be implemented. As shown, the system 500 includes, without limitation, a central processing unit (CPU) 510, a network interface 530, an interconnect 515, a memory 560 and storage 520, where the storage 520 includes sample images 521 and calibration data 522. The system 500 may also include an I/O device interface 540 connecting I/O devices 550 (e.g., keyboard, display and mouse devices) to the system 500.

The CPU 510 retrieves and executes programming instructions stored in the memory 560. Similarly, the CPU 510 stores and retrieves application data residing in the memory 560. The interconnect 515 facilitates transmission, such as of programming instructions and application data, between the CPU 510, I/O device interface 540, storage 520, network interface 530, and memory 560. CPU 510 is included to be representative of a single CPU, multiple CPUs, a single CPU having multiple processing cores, and the like. And the memory 560 is generally included to be representative of a random access memory. The storage 520 may be a disk drive storage device. Although shown as a single unit, the storage 520 may be a combination of fixed and/or removable storage devices, such as tape drives, removable memory cards or optical storage, network attached storage (NAS), or a storage area-network (SAN). Further, system 500 is included to be representative of a physical computing system as well as virtual machine instances hosted on a set of underlying physical computing systems. Further still, although shown as a single computing system, one of ordinary skill in the art will recognized that the components of the system 500 shown in FIG. 5 may be distributed across multiple computing systems connected by a data communications network.

As shown, the memory 560 includes an operating system 561 and applications 562-564. Illustratively, the operating system may include Microsoft's Windows®. The applications 562-564 include a pre-processing application 562, a calibration application 563, and an aesthetic signature application 564. As discussed above, the pre-processing application 562 may calculate one or more elements which are used to determine image attribute values. In one embodiment, pre-processing may include computing bilateral pyramids, focus maps, binary maps of in-focus regions, binary maps of out-of-focus regions, an in-focus area, and an out-of-focus area, as discussed above with respect to FIGS. 3-4. The calibration application 563 may determine a mapping between objectively-determined values of one or more image attributes and corresponding subjective values for those attributes. In one embodiment, the calibration application 463 may be configured to calculate objective values for one or more attributes of a sample set of images and, based on those calculated values and corresponding subjective attribute values, determine a transducer function for each image attribute, as discussed above with respect to FIG. 3. The aesthetic signature application 564 may generate image aesthetic signatures which include one or more estimated subjective attribute values for an input image. In one embodiment, the aesthetic signature application 564 may be configured to calculate objective values and determine estimated subjective values based on those objective values using corresponding transducer functions, as discussed above with respect to FIG. 4. In a further embodiment, the aesthetic signature application 564 may be configured to apply the estimated subjective attribute values to, for example, compare the overall image aesthetics of two or more images.

Although described herein with respect to applications 562-564, in alternative embodiments, pre-processing, calibration, and aesthetic signature generation and use may be performed by any one or more applications.

Advantageously, techniques disclosed herein map objective image attribute values to subjective image attributes values via transducer functions. Such a mapping permits more accurate estimations of subjective image attribute judgments. One or more estimated subjective image attributes may be taken together as an image signature which indicates the aesthetic characteristics of an image. Further, the estimated subjective image attribute value(s) or image signature may have a variety of applications, including, but not limited to, comparing two images to determine which is more aesthetically pleasing and guiding a user during image editing.

While the foregoing is directed to aspects of the present invention, other and further aspects of the invention may be devised without departing from the basic scope thereof, and the scope thereof is determined by the claims that follow.

What is claimed is:

1. A computer-implemented method to evaluate image aesthetics, based objective-to-subjective attribute mappings, the computer-implemented method comprising:
   determining objective attribute values for each of one or more aesthetic attributes for each image in a first set of images, via one or more processors and based on at least one pre-processing element determined for the respective image;
   determining, for the respective aesthetic attribute, a mapping from the objective attribute values to respective, computationally estimated subjective attribute values, based on the objective attribute values and corresponding, experimentally determined subjective attribute values; and
   applying, to a next image not in the first set of images, the mapping for at least a first of the one or more aesthetic attributes, in order to computationally estimate a subjective attribute value for the next image, based on an objective attribute value for the next image.

2. The computer-implemented method of claim 1, further comprising:
   determining objective attribute values for the one or more aesthetic attributes for the next image; and
   for each of the one or more aesthetic attributes, estimating a subjective attribute value for the next image by applying the corresponding mapping to the corresponding objective attribute value for the next image.

3. The computer-implemented method of claim 2, further comprising:
   determining objective attribute values for the one or more attributes for a second set of images;
   for each of the one or more aesthetic attributes, estimating subjective attribute values for the images of the second set by applying the corresponding mapping to the corresponding objective attribute values for the images of the second set; and
   comparing the next image and the images of the second set based on their respective estimated subjective attribute values.

4. The computer-implemented method of claim 3, wherein comparing the next image and the images of the second set of images includes estimating overall measures of aesthetic values for each of the next image and images of the second set based on their respective estimated subjective attribute values and comparing the overall measures of aesthetic values.

5. The computer-implemented method of claim 2, further comprising:

generating a graphical representation of the estimated subjective attribute values; and displaying the graphical representation to a user.

6. The computer-implemented method of claim 1, wherein the one or more aesthetic attributes includes at least one of sharpness, depth, clarity, tone, and colorfulness.

7. The computer-implemented method of claim 1, wherein the subjective attribute value for the next image is computationally estimated without requiring any experimentally determined subjective attribute value for the next image, wherein the at least one pre-processing element is selected from a plurality of pre-processing elements including: (i) a bilateral pyramid; (ii) a focus map including one or more levels; (iii) at least one of a binary map and an area, of an in-focus region in the respective image; and (iv) at least one of a binary map and an area, of an out-of-focus region in the respective image.

8. The computer-implemented method of claim 7, wherein the computer-implemented method further comprises:
    determining objective attribute values for the one or more aesthetic attributes for the next image;
    for each of the one or more aesthetic attributes, estimating a subjective attribute value for the next image by applying the corresponding mapping to the corresponding objective attribute value for the next image;
    determining objective attribute values for the one or more attributes for a second set of images;
    for each of the one or more aesthetic attributes, estimating subjective attribute values for the images of the second set by applying the corresponding mapping to the corresponding objective attribute values for the images of the second set; and
    comparing the next image and the images of the second set based on their respective estimated subjective attribute values.

9. The computer-implemented method of claim 8, wherein the objective attribute values are determined based on at least three of the plurality of pre-processing elements, wherein the one or more aesthetic attributes comprises a plurality of aesthetic attributes that includes sharpness, depth, clarity, tone, and colorfulness;
    wherein comparing the next image and the images of the second set of images includes estimating overall measures of aesthetic values for each of the next image and images of the second set based on their respective estimated subjective attribute values and comparing the overall measures of aesthetic values, wherein the computer-implemented method further comprises:
    generating a graphical representation of the estimated subjective attribute values; and
    displaying the graphical representation to a user.

10. The computer-implemented method of claim 9, wherein the objective attribute values are determined based on at least four of the plurality of pre-processing elements;
    wherein the value of the sharpness attribute is determined based at least on average contrast magnitude of a focus map level with highest image contrast frequency;
    wherein the value of the depth attribute is determined based at least on a largest area with non-zero response in all focus map levels excluding a focus map level with highest image contrast frequency;
    wherein the value of the clarity attribute is determined based at least on the area of the out-of-focus region and a difference of an average contrast within the in-focus region with an average contrast in the out-of-focus region;
    wherein the value of the tone attribute is determined based at least on a difference between maximum and minimum gamma-corrected luminance values.

11. The computer-implemented method of claim 10, wherein each image is decomposed via bilateral pyramid decomposition, wherein the plurality of pre-processing elements are determined, the plurality of pre-processing elements including the bilateral pyramid, the focus map, each of the binary map and the area of each of the in-focus region and the out-of-focus region, wherein the objective attribute values are determined based on the plurality of pre-processing elements, wherein the mapping comprises a transducer function.

12. A computer-implemented method comprising:
    for each image in a first set of images:
        decomposing the image via bilateral pyramid decomposition;
        determining a focus map for the image, the focus map including one or more levels;
        determining a binary map of an in-focus region for the image;
        determining a binary map of an out-of-focus region for the image;
        determining an area of the in-focus region; and
        determining an area of the out-of-focus region;
    determining, via one or more processors, objective attribute values for each of one or more aesthetic attributes for each image in the first set, wherein the one or more aesthetic attributes includes at least one of sharpness, depth, clarity, tone, and colorfulness; and
    determining, for each aesthetic attribute, a mapping from the objective attribute values to respective estimated subjective attribute values, based on the objective attribute values and corresponding experimentally-determined attribute values.

13. The computer-implemented method of claim 12, wherein the value of the sharpness attribute is determined based at least on average contrast magnitude of a focus map level with highest image contrast frequency.

14. The computer-implemented method of claim 12, wherein the value of the depth attribute is determined based at least on a largest area with non-zero response in all focus map levels excluding a focus map level with highest image contrast frequency.

15. The computer-implemented method of claim 12, wherein the value of the clarity attribute is determined based at least on the area of the out-of-focus region and a difference of an average contrast within the in-focus region with an average contrast in the out-of-focus region.

16. The computer-implemented method of claim 12, wherein the value of the tone attribute is determined based at least on a difference between maximum and minimum gamma-corrected luminance values.

17. A non-transitory computer-readable medium storing a program which, when executed, performs operations comprising:
    determining, for each image in a first set of images, a plurality of pre-processing elements including at least two of: (i) a bilateral pyramid; (ii) a focus map including one or more levels; (iii) at least one of a binary map and an area, of an in-focus region in the respective image; and (iv) at least one of a binary map and an area, of an out-of-focus region in the respective image;
    determining objective attribute values for each of one or more aesthetic attributes for the respective image in the first set, via one or more processors when executing the program and based on the plurality of pre-processing elements; and determining, for the respective aesthetic attribute, a mapping from the objective attribute values to respective, computationally estimated subjective attribute values, based on the objective attribute values and corresponding, experimentally determined subjective attribute values.

18. The non-transitory computer-readable medium of claim 17, the operations further comprising:
determining objective attribute values for the one or more aesthetic attributes for a first image; and
for each of the one or more aesthetic attributes, estimating a subjective attribute value for the first image by applying the corresponding mapping to the corresponding objective attribute value for the first image.

19. The non-transitory computer-readable medium of claim 18, the operations further comprising:
determining objective attribute values for the one or more attributes for a second set of images;
for each of the one or more aesthetic attributes, estimating subjective attribute values for the images of the second set by applying the corresponding mapping to the corresponding objective attribute values for the images of the second set; and
comparing the first image and the images of the second set based on their respective estimated subjective attribute values.

20. The non-transitory computer-readable medium of claim 19, wherein comparing the first image and the images of the second set of images includes estimating overall measures of aesthetic values for each of the first image and images of the second set based on their respective estimated subjective attribute values and comparing the overall measures of aesthetic values.

21. The non-transitory computer-readable medium of claim 20, the operations further comprising:
generating a graphical representation of the estimated subjective attribute values; and
displaying the graphical representation to a user.

22. The non-transitory computer-readable medium of claim 17, wherein the one or more aesthetic attributes includes at least one of sharpness, depth, clarity, tone, and colorfulness.

23. The non-transitory computer-readable medium of claim 17, wherein the plurality of pre-processing elements includes: (i) the bilateral pyramid; (ii) the focus map; and (iii) the at least one of the binary map and the area, of the in-focus region in the respective image.

24. The non-transitory computer-readable medium of claim 17, wherein the plurality of pre-processing elements includes: (i) the bilateral pyramid; (ii) the focus map; and (iv) the at least one of the binary map and the area, of the out-of-focus region in the respective image.

25. The non-transitory computer-readable medium of claim 17, wherein the plurality of pre-processing elements includes: (i) the bilateral pyramid; (iii) the at least one of the binary map and the area, of the in-focus region in the respective image; and (iv) the at least one of the binary map and the area, of the out-of-focus region in the respective image.

26. The non-transitory computer-readable medium of claim 17, wherein the plurality of pre-processing elements includes: (ii) the focus map; (iii) the at least one of the binary map and the area, of the in-focus region in the respective image; and (iv) the at least one of the binary map and the area, of the out-of-focus region in the respective image.

27. A non-transitory computer-readable medium storing a program which, when executed, performs operations comprising:

pre-processing each image in a first set of images by performing the steps of:
decomposing the image via bilateral pyramid decomposition;
determining a focus map for the image, the focus map including one or more levels;
determining a binary map of an in-focus region for the image;
determining a binary map of an out-of-focus region for the image;
determining an area of the in-focus region; and
determining an area of the out-of-focus region;
determining, via one or more processors, objective attribute values for each of one or more aesthetic attributes for each image in the first set, wherein the one or more aesthetic attributes includes at least one of sharpness, depth, clarity, tone, and colorfulness; and
determining, for each aesthetic attribute, a mapping from the objective attribute values to respective estimated subjective attribute values, based on the objective attribute values and corresponding experimentally-determined attribute values.

28. A system, comprising:
a processor; and
a memory including an application program which, when executed on the processor, performs operations comprising:
determining, for each image in a first set of images, a plurality of pre-processing elements including at least two of: (i) a bilateral pyramid; (ii) a focus map including one or more levels; (iii) at least one of a binary map and an area, of an in-focus region in the respective image; and (iv) at least one of a binary map and an area, of an out-of-focus region in the respective image;
determining objective attribute values for each of one or more aesthetic attributes for each the respective image in the first set, based on the plurality of pre-processing elements; and
determining, for the respective aesthetic attribute, a mapping from the objective attribute values to respective, computationally estimated subjective attribute values, based on the objective attribute values and corresponding, experimentally determined subjective attribute values.

29. The system of claim 28, wherein the operations further comprise:
determining objective attribute values for the one or more aesthetic attributes for a first image; and
for each of the one or more aesthetic attributes, estimating a subjective attribute value for the first image by applying the corresponding mapping to the corresponding objective attribute value for the first image.

30. The system of claim 28, wherein the plurality of pre-processing elements includes: (i) the bilateral pyramid; (ii) the focus map; and (iii) the at least one of the binary map and the area, of the in-focus region in the respective image.

31. The system of claim 28, wherein the plurality of pre-processing elements includes: (i) the bilateral pyramid; (ii) the focus map; and (iv) the at least one of the binary map and the area, of the out-of-focus region in the respective image.

32. The system of claim 28, wherein the plurality of pre-processing elements includes: (i) the bilateral pyramid; (iii) the at least one of the binary map and the area, of the in-focus region in the respective image; and (iv) the at least one of the binary map and the area, of the out-of-focus region in the respective image.

33. The system of claim 28, wherein the plurality of pre-processing elements includes: (ii) the focus map; (iii) the at least one of the binary map and the area, of the in-focus region in the respective image; and (iv) the at least one of the binary map and the area, of the out-of-focus region in the respective image.

34. A system, comprising:
a processor; and
a memory including an application program which, when executed on the processor, performs operations comprising:
  for each image in a first set of images:
    decomposing the image via bilateral pyramid decomposition;
    determining a focus map for the image, the focus map including one or more levels;
    determining a binary map of an in-focus region for the image;
    determining a binary map of an out-of-focus region for the image;
    determining an area of the in-focus region; and
    determining an area of the out-of-focus region;
  determining objective attribute values for each of one or more aesthetic attributes for each image in the first set; and
  determining, for each aesthetic attribute, a mapping from the objective attribute values to respective estimated subjective attribute values, based on the objective attribute values and corresponding experimentally-determined attribute values.

* * * * *

UNITED STATES PATENT AND TRADEMARK OFFICE
CERTIFICATE OF CORRECTION

PATENT NO. : 9,013,497 B2  
APPLICATION NO. : 13/560271  
DATED : April 21, 2015  
INVENTOR(S) : Aydin et al.

Page 1 of 1

It is certified that error appears in the above-identified patent and that said Letters Patent is hereby corrected as shown below:

In the Specification

In Detailed Description:

Column 6, Line 12, please delete "$C = |I-LP^1| + \Sigma_{k=1}^{K-1} |LP^k - LP^{k+1}|$," and insert -- $C = |I - LP^1| + \sum_{k=1}^{K-1} |LP^k - LP^{k+1}|$ -- therefor;

Column 10, Line 6, please delete "attributes" and insert --attribute-- therefor;

In the Claims

Column 14, Claim 28, Line 37, please delete "each".

Signed and Sealed this  
Twenty-second Day of September, 2015

Michelle K. Lee  
*Director of the United States Patent and Trademark Office*